United States Patent [19]

Emmenthal

[11] 4,182,294
[45] Jan. 8, 1980

[54] APPARATUS FOR INJECTING FUEL INTO A MULTI-CYLINDER INTERNAL COMBUSTION ENGINE HAVING A SUPERCHARGING COMPRESSOR

[75] Inventor: Klaus-Dieter Emmenthal, Wolfsburg, Fed. Rep. of Germany

[73] Assignee: Volkswagenwerk Aktiengesellschaft, Wolfsburg, Fed. Rep. of Germany

[21] Appl. No.: 932,561

[22] Filed: Aug. 10, 1978

[30] Foreign Application Priority Data

Aug. 23, 1977 [DE] Fed. Rep. of Germany ....... 2737849

[51] Int. Cl.$^2$ .................. F02B 37/00; F02B 15/00; F02M 39/00; F02B 33/42
[52] U.S. Cl. ........................ 123/119 C; 123/32 R; 123/139 AW; 60/605
[58] Field of Search ............... 123/32 F, 32 G, 32 R, 123/127, 119 D, 119 C, 119 DB, 139 AW, 179 L, 34 R; 60/601, 603, 605; 261/DIG. 51

[56] References Cited

U.S. PATENT DOCUMENTS

| 2,205,750 | 6/1940 | Ross | 123/127 |
| 2,221,405 | 11/1940 | Nallinger | 123/32 F |
| 2,560,213 | 7/1951 | Cannon | 123/127 |
| 2,849,992 | 9/1958 | Stillebroer et al. | 123/32 F |
| 2,851,024 | 9/1958 | Meeder | 123/119 C |
| 3,941,104 | 3/1976 | Egli | 123/119 C |
| 4,083,188 | 4/1978 | Kumm | 60/605 |

FOREIGN PATENT DOCUMENTS 592782 9/1947 United Kingdom ................. 123/32 F Primary Examiner—Charles J. Myhre
Assistant Examiner—P. S. Lall
Attorney, Agent, or Firm—Brumbaugh, Graves, Donohue & Raymond

[57] ABSTRACT

Apparatus for injecting fuel into the intake assembly of a multi-cylinder internal combustion engine, the intake assembly including an intake manifold communicating with cylinder intake ports, an intake passage connected to the manifold, and a supercharging compressor in the intake passage. The fuel injection apparatus comprises a distributor for injecting fuel into the manifold adjacent the intake ports, a center injection line for injecting fuel into the intake passage upstream of the compressor, and a controlled valve for supplying fuel primarily to the distributor at lower engine speeds, and for supplying a progressively larger portion of the fuel into the center injection line with increasing engine load.

8 Claims, 1 Drawing Figure

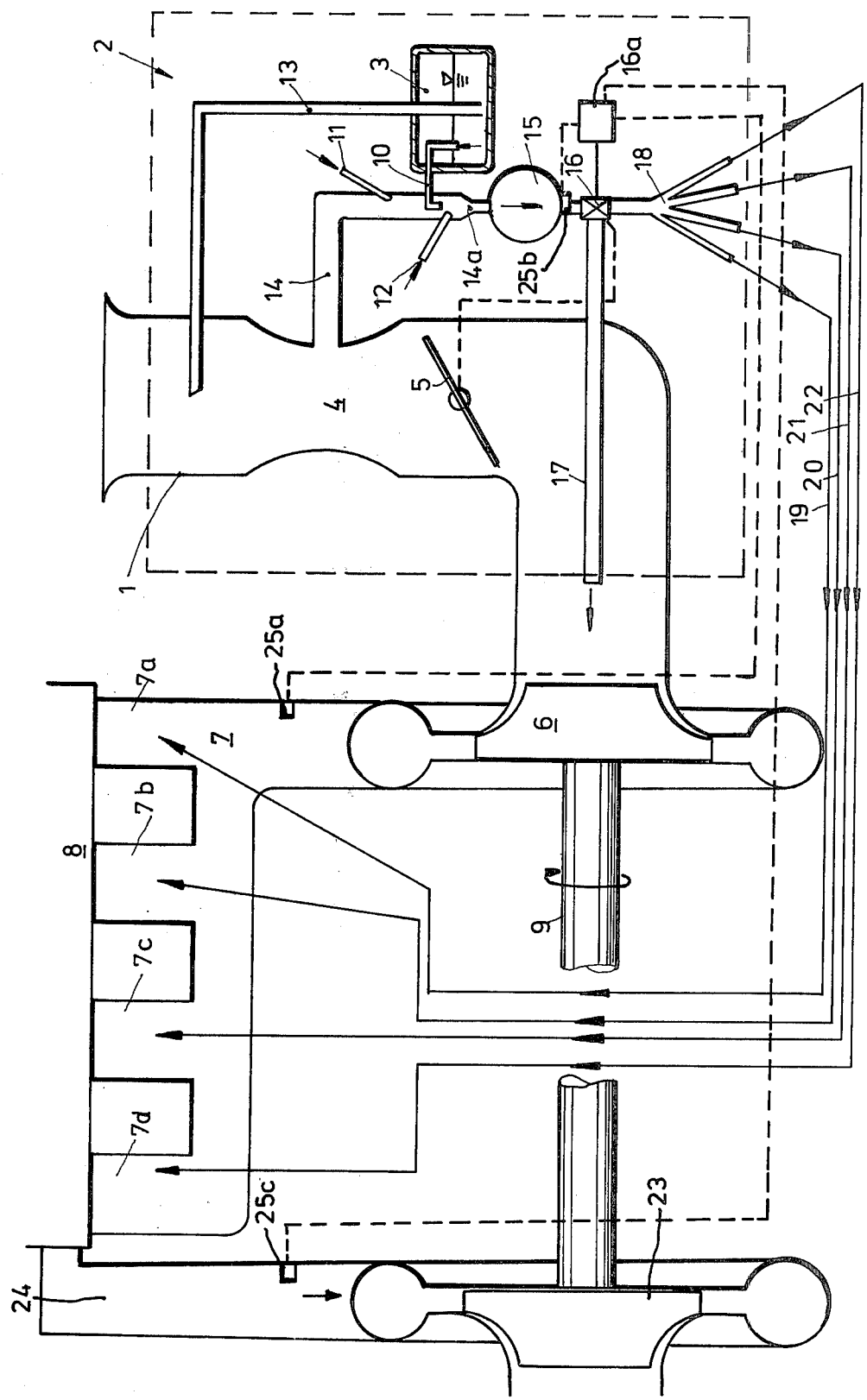

APPARATUS FOR INJECTING FUEL INTO A MULTI-CYLINDER INTERNAL COMBUSTION ENGINE HAVING A SUPERCHARGING COMPRESSOR

BACKGROUND OF THE INVENTION

Stricter regulation of pollutants in the exhause gas of internal combustion engines, in particular automobile engines, together with the desirability of increased efficiency in fuel consumption, render precise fuel apportioning, as well as delivery under optimum conditions, imperative. In conventional carburetor installations, precise apportionment of small fuel quantities uniformly among the individual cylinders is difficult because large portions of the fuel condense on the walls of the intake passage and run along in the form of droplets. This not only makes fuel apportionment considerably more difficult, but also results in poorer performance of the engine, particularly at unsteady operating states. This condition may be improved by providing a fuel injection device for injecting fuel in precise quantities into the intake ports of the individual cylinders.

In internal combustion engines operating with a supercharging compressor in the intake passage, for example, an exhaust driven supercharging compressor, similar conditions prevail. Additional difficulties result, however, since the compression of the intake air will cause a temperature rise, with the danger of knocking, especially at higher loads. Knocking becomes especially noticeable if a fuel injection device as described above is employed. Knocking will be less acute in carburetor installations where the fuel is added to the air before passing through the compressor, since as the fuel in the mixture vaporizes, it will absorb heat thus tending to reduce the temperature of the compressed mixture.

SUMMARY OF THE INVENTION

The present invention is a fuel injection apparatus for use with an engine having a supercharging compressor in the intake passage which supplies the intake air to the intake manifold of the engine under pressure. This apparatus provides not only a precise apportionment of fuel to the individual cylinders to avoid the disadvantages of a wet intake passage at small loads, but also avoids the danger of knocking or pinging at higher levels.

More particularly, the fuel injection apparatus includes a controlled valve which at lower engine loads supplies fuel from the fuel injection apparatus directly to the intake ports of the individual cylinders, and, as engine load increases, diverts a progressively greater portion of the fuel into the intake passage upstream of the compressor, where it is mixed with the intake air before being compressed.

In the preferred form of the apparatus, the fuel is pumped through a controlled reversing valve which, in the case of small engine load delivers the fuel through a distributor directly to the intake ports of the individual cylinders of the engine. In response to increased engine load, the valve diverts a progressively greater portion of fuel to a single injection point in the intake passage upstream of the compressor. As a result of this arrangement, the fuel apportionment is precise at small engine load inasmuch as the intake passage of the engine remains dry. As the load increases, fuel in progressively greater amounts is injected into the intake passage, and the compressor will therefore be compressing a greater mixture of fuel to air. As a result, the danger of knocking at greater engine load will be reduced, since with increasing load a greater amount of fuel will be vaporized, thus absorbing a greater amount of heat.

The reversing valve is preferably controlled by a quantity characteristic of the output of the engine. For example, the reversing valve may be operated responsive to the position of the throttle or the pressure in the intake passage downstream of the compressor. Alternatively, it may be controlled by the exhaust back-pressure of the exhaust driven supercharger. In the case of a fuel injection apparatus which uses air-assisted fuel injection, in which the pressure of the delivered fuel air mixture increases with increasing load, the delivery pressure may be used to control the delivery of the fuel either into the intake passage or directly to the intake ports.

BRIEF DESCRIPTION OF THE DRAWING

Further advantages and characteristics of the invention will become apparent from the Detailed Description of the Preferred Embodiments, and from the drawing, which is a schematic of a fuel injection apparatus according to the invention for a multi-cylinder internal combustion engine having a supercharging compressor in the intake passage.

DETAILED DESCRIPTION OF THE PREFERRED EMBODIMENT

Referring to the drawing, an internal combustion engine has a fuel injection apparatus 2 for providing fuel to an intake assembly including an intake manifold 7 and individual intake ports 7a, 7b, 7c and 7d of the individual cylinders of the engine block 8. The device shown in an air-assisted fuel injection apparatus. A venturi 4 is provided in the air intake passage 1, and air needed for the air-supported fuel injection is drawn off by way of line 14 connected at the narrow cross section of the venturi 4. Downstream of the venturi 4, a conventional throttle valve 5 is disposed in the intake passage 1, and between the throttle valve 5 and intake manifold 7, a supercharging compressor 6 is arranged for raising the pressure of the intake air, or of an air-fuel mixture, as described further below. The compressor 6 may be driven by a turbine apparatus disposed in the exhaust gas line 24 of the engine, which rotates the compressor shaft 9.

The fuel injection apparatus 2 shown has a hook-shaped main enrichment tube 10 for supplying fuel into the line 14. The fuel output of line 14 will be determined essentially by the load-dependent negative pressure prevailing in the narrow section of the venturi 4. The main enrichment tube 10 opens at one end in a float chamber 3, which by way of a needle valve and float (not shown) controlling the fuel intake, maintains its fuel level constant. An enricher tube 13 is also provided which opens at one end into the float chamber 3 at a point below the fuel level, and at its other end projects into the intake passage 1 upstream of the venturi 4. Another pipe 11 projects into the air duct 14 for delivering fuel in the idling and transition modes of the engine. Another injection pipe 12 is also provided which connects with an acceleration pump (not shown) for providing extra fuel during acceleration. The separate fuel delivery pipes 10, 11, and 12 are suitably arranged so that their outlet openings are oriented toward the narrow suction cross section 14a of a pump 15 conveying the fuel air mixture.

The mixture delivery pump 15 supplies the fuel through a reversing valve 16 which in turn directs the fuel either through a center injection line 17 for injection fuel into the intake passage 1 upstream of the compressor 6, or to a distributor 18 for injecting fuel into the intake manifold adjacent the individual intake ports of the engine. The distributor 18 provides for uniform distribution of the fuel air mixture among four injection lines 19, 20, 21 and 22 whose outlets will be intake ports 7a, 7b, 7c and 7d, respectively.

The position of reversing valve 16 is controlled dependent upon the load condition of the engine, either for providing the fuel to the distributor 18 at low engine loads, or for providing the fuel to the center injection line 17 in progressively greater amounts as the engine load increases. The control quantity may be, for example, the position of the throttle valve 5, the pressure in the intake passage 1 downstream of the compressor 6, or, where the compressor 6 is exhaust driven, the exhaust back pressure. In the device shown, the reversing valve may be controlled in a simple manner as a function of the delivery pressure of the fuel-air mixture from the pump 15. In the case of an air-assisted fuel injection device as shown, the delivery pressure of the mixture delivery pump 15 is not constant, but rather increases as the proportion of the fuel in the mixture increases (i.e., the load increases). This results due to the increasing resistance in the delivery line downstream of the pump 15. Thus, the delivery of the fuel-air mixture may be controlled by having a reversing valve 16 in the form of an overload valve which normally supplies fuel to the distributor 18, but which opens to the center injection line 17 when a given pressure is exceeded. It is preferable that not only is the valve designed to open at an appropriate predetermined delivery pressure, but also that the valve allow a progressively greater portion of the fuel-air mixture from the pump 15 to pass into the center injection line 17 as the delivery pressure, and thus engine load, increases.

Alternatively, a control apparatus 16a may be provided for controlling the reversing valve 16, which is operable in response to characteristic engine pressures. This may be done with conventional pressure sensing devices 25a, 25b, and 25c, respectively placed, for example, in the intake passage 1 downstream of the compressor 6, or in the fuel delivery line between the pump 15 and reversing valve 16, or, where the supercharging compressor 6 is exhaust driven, in the exhaust line of the engine upstream of the exhaust turbine apparatus to measure back pressure. Rather than a characteristic engine pressure, the position of the throttle valve 5 may also be used to control the reversing valve 16.

In place of the air-assisted fuel injection device shown in the drawing, a conventional fuel injection device, in which liquid fuel is injected by way of injection nozzles, may also be used. A similar arrangement would be used in which at lower loads, a precise distribution of the relatively small fuel quantities would be effected to the individual fuel cylinders, and at larger loads, a substantial portion of the fuel would be injected into the intake passage upstream of the compressor 6. In the compressor, the fuel and air would be mixed, thus providing a homogenous mixture in the intake manifold, which in turn will be uniformly distributed over the individual cylinders of the engine. As in the aforementioned embodiment, the evaporation of the fine fuel droplets contained in the mixture will also decrease the compression end temperature which largely reduces the danger of knocking, especially at higher engine loads.

The embodiments of the invention described herein are merely illustrative, and the invention may be embodied in other forms while still employing the inventive principles contained herein. Thus, various modifications will be apparent to those skilled in the art, and all such modifications and variations are intended to be within the scope of the invention as defined in the following claims.

I claim:

1. In a multi-cylinder internal combustion engine having an intake assembly comprising an intake manifold communicating with cylinder intake ports, an intake passage connected to said manifold and a supercharging compressor in said intake passage, apparatus for injecting fuel into said intake assembly comprising first fuel injection means for injecting fuel into said manifold adjacent said intake ports, second fuel injection means for injecting fuel into said passage upstream of said compressor, and controlled means for supplying fuel primarily to said first fuel injection means at lower engine loads, and for supplying a progressively larger portion of the fuel to said second fuel injection means with increasing engine load.

2. Apparatus according to claim 1, wherein said first fuel injection means comprises a distributor means for separate injection of the fuel into said intake ports, and said controlled means includes a reversing valve connected to said distributor means and said second fuel injection means.

3. Apparatus according to claim 2, wherein said controlled means comprises means responsive to engine output for controlling said reversing valve.

4. Apparatus according to claim 2, wherein said controlled means comprises means responsive to the pressure in said intake passage downstream of said compressor for controlling said reversing valve.

5. Apparatus according to claim 2 for use in an engine having an exhaust passage wherein there is provided exhaust driven means in said exhaust passage for driving said compressor, and said controlled means comprises means responsive to the pressure in said exhaust passage upstream of said exhaust driven means for controlling said reversing valve.

6. Apparatus according to claim 2, wherein the fuel injecting apparatus includes means for supplying a fuel-air mixture to said controlled means under pressure, said mixture dependent upon engine load and said pressure increasing with engine load, and wherein said controlled means comprises means responsive to said pressure for controlling said reversing valve.

7. Apparatus according to claim 6, wherein said reversing valve is an overload valve arranged in said second fuel injection means which opens in response to a predetermined pressure of fuel-air mixture.

8. Apparatus according to claims 1, 2, 3, 4, 5, 6 or 7, wherein said controlled means supplies fuel primarily to said second fuel injection means at higher engine loads.

* * * * *